(12) United States Patent
Song et al.

(10) Patent No.: US 6,699,364 B2
(45) Date of Patent: Mar. 2, 2004

(54) WATER SPRAY FOR SMOOTH SURFACE GYPSUM FIBERBOARD PANELS

(75) Inventors: Weixin Song, Waukegan, IL (US); David Paul Miller, Lindenhurst, IL (US)

(73) Assignee: United States Gypsum Corporation, Chicago, IL (US)

( * ) Notice: Subject to any disclaimer, the term of this patent is extended or adjusted under 35 U.S.C. 154(b) by 16 days.

(21) Appl. No.: 10/284,617

(22) Filed: Oct. 31, 2002

(65) Prior Publication Data

US 2003/0049450 A1 Mar. 13, 2003

Related U.S. Application Data

(62) Division of application No. 09/314,097, filed on May 18, 1999.

(51) Int. Cl.[7] ................................................. B32B 1/52
(52) U.S. Cl. ........................ 162/205; 162/210; 162/208; 264/86; 156/39
(58) Field of Search ................................ 162/205, 208, 162/210; 264/86; 156/39

Primary Examiner—Richard Weisberger
(74) Attorney, Agent, or Firm—Barnes & Thornburg; John M. Lorenzen; David F. Janci

(57) ABSTRACT

An improved method and apparatus for imparting a smooth surface to gypsum fiber panels. The method involves imparting energy to the surface of a slurry as the slurry is dewatered just prior to rehydration. The apparatus used to impart the energy is a water spray including a source of pressurized water such as a pump, a distribution manifold and a plurality of nozzles to direct the water spray at the surface of the slurry. In operation, the water spray is directed against the surface of the slurry. The flow disrupts the slurry to a fraction of its total depth, thus dispersing clumps or flocs of commingled crystals and fibers in the depth that would give the surface of the finished panel a rough surface if they were allowed to remain.

17 Claims, 4 Drawing Sheets

WATER SPRAY FOR SMOOTH SURFACE GYPSUM FIBERBOARD PANELS

This Application is a Division of application Ser. No. 09/314,097 filed May 18, 1999.

BACKGROUND OF THE INVENTION

The present invention relates generally to the ability to improve the surface smoothness on composite materials for use in the construction industry. More particularly, the present invention relates to the use of a water spray to impart energy to the surface of the material when the composite material is still in a slurry or semi-slurry state where such energy acts to break up flocs or clumps of composite materials that render a rougher surface on the finished product.

The United States Gypsum Company's gypsum fiberboard process, as shown and described in U.S. Pat. No. 5,320,677, and herein incorporated by reference in its entirety, describes a composite product and a process for producing a composite material in which a dilute slurry of gypsum particles and cellulosic fibers are heated under pressure to convert the gypsum, i.e. calcium sulfate in the stable dihydrate state ($CaSO_4.2H_2O$), to calcium sulfate alpha hemihydrate having acicular crystals. The cellulosic fibers have pores or voids on the surface and the alpha hemihydrate crystals form within, on and around the voids and pores of the cellulosic fibers. The heated slurry is then dewatered to form a mat, preferably using equipment similar to paper making equipment, and before the slurry cools enough to rehydrate the hemihydrate to gypsum, the mat is pressed into a board of the desired configuration. The pressed mat is cooled and the hemihydrate rehydrates to gypsum to form a dimensionally stable, strong and useful building board. The board is thereafter trimmed and dried.

One of the many advantages of the process disclosed in the '677 patent is that the surface of the resulting gypsum panel can be smoothed, or in the alternative, textured as the panel is being formed. The challenge in treating the surface of gypsum fiberboard during in-line processing is the timing of the treatment made on the slurry or wet mat. The smoothing as taught in this application begins while the material is still in a slurry or just beginning to form a semi-slurry state.

As the rehydratable calcium sulfate hemihydrate and cellulosic fibers in a slurry form leave the head box, and are disposed upon the conveyor belt or forming wire, the slurry will have a temperature generally in the range of about 200° F. +/−10°. Thereafter, as the slurry is spread to create a forming pond across the conveyor the action of vacuum pumps begins removal of the free water and the temperature drops significantly and the rehydration process begins.

As the slurry exits the head box, the dewatering process begins with the action of the vacuum pumps. However, commingled crystals and fibers may collect and form clumps or flocs, which is undesirable at the surface of the product. It is preferred that the clumps or flocs have a greatest dimension less than approximately 6 mm. When rehydrated, clumps of commingled crystals and fibers larger than 6 mm impart an undesirable roughness to the surface of the finished material. Roughness of wet felted products is detrimental to final installations where surface finish is important to final applications, such as painted surfaces (walls) and thin overlays (vinyl laminations). One contributor to such roughness is the condition present in the forming pond during substrate manufacture.

Typically at least two factors increase roughness: high consistencies and long fiber content. These are known to be minimized by the addition of water to lower consistencies or by agitation in the slurry pond. Both of these methods though have other undesirable effects. The addition of water adversely affects drainage rates and may cause line speed decreases and increase vacuum demands. Agitation in the pond may adversely affect the preferred form of matrix formation which is collective sedimentation, as the slurry is dewatered into a filter cake if the agitation is applied in the wrong stage of formation of the product or at the wrong level in the pond. In addition, if the agitation is used with a slurry having a raw material mix of widely divergent densities or settling rates, such as is common with high filler fine paper or wet process gypsum fiberboard, the lower density material will separate from the higher density material, causing a nonuniform product in the case of the wet process gypsum fiberboard. The separation of material may also result in a decreasing first pass retention on the forming wire as higher density materials that should remain on the forming table are drawn off by the vacuum boxes during dewatering and returned upstream of the head box for recirculation into the slurry.

A variety of other methods have been attempted to modify forming pond characteristics to improve surface smoothness, such as vibrating rods, vibrating plates, rotating rolls, smooth top plates, water sprays, etc. The use of the water spray described herein, applied in the area of the wet line, has yielded better surface smoothness when compared to fiberboards smoothed using the other methods.

SUMMARY OF THE INVENTION

The present invention relates generally to producing gypsum fiberboard panels with a smooth surface texture. More particularly, the present invention relates to the use of a water spray to impart a smooth surface texture to gypsum fiberboard panels.

A water spray with proper pressure, angle of incidence and distance from surface, may be applied in the formation pond of wet felted products, particularly those formed at high consistency, to modify slurry properties during formation and improve properties, in particular surface smoothness of the final panel.

With reference to the process of the '677 patent, in the present invention energy is selectively applied to the top of the forming pond close to the wet line by a water spray of sufficient energy to disperse clumps in the pond surface and slightly below it, but insufficient energy to disrupt the pond more than slightly below the surface. This energy disperses flocs or clumps of commingled material during mat formation without disrupting the preferred method of collective sedimentation.

The water spray extends across the forming pond between the opposing side dams of the forming table. The water spray is applied perpendicular to the surface of the slurry. It has been found that a spray applied at a low flow rate or low pressure 10 psi to 50 psi can impart the required energy with the advantage of reduced water addition and subsequent required removal over that of a conventional water spray designed to lower consistencies.

One method of generating this water spray is to connect a source of water to a distribution manifold equipped with a plurality of nozzles. The water source may be any water source that can deliver water at a pressure, such as a gravity tank, municipal water supply, or hydraulic pump. The nozzles are installed to deliver a uniform spray along a two dimensional path. Experimentation with various pressures and flow rates has shown superior performance with decreasing pressures or decreasing flow rates. The performance of the water spray method described herein is dependent upon the imparting of energy by the water spray, not upon the simple addition of water.

DETAILED DESCRIPTION OF THE PREFERRED EMBODIMENT

The present invention is directed to a forming system for imparting a smooth surface to gypsum fiberboard panels during their manufacture, and in particular, the use of a water spray to impart a smooth surface on the panels when the panels are still in a slurry or semi-slurry state.

Figure 1:
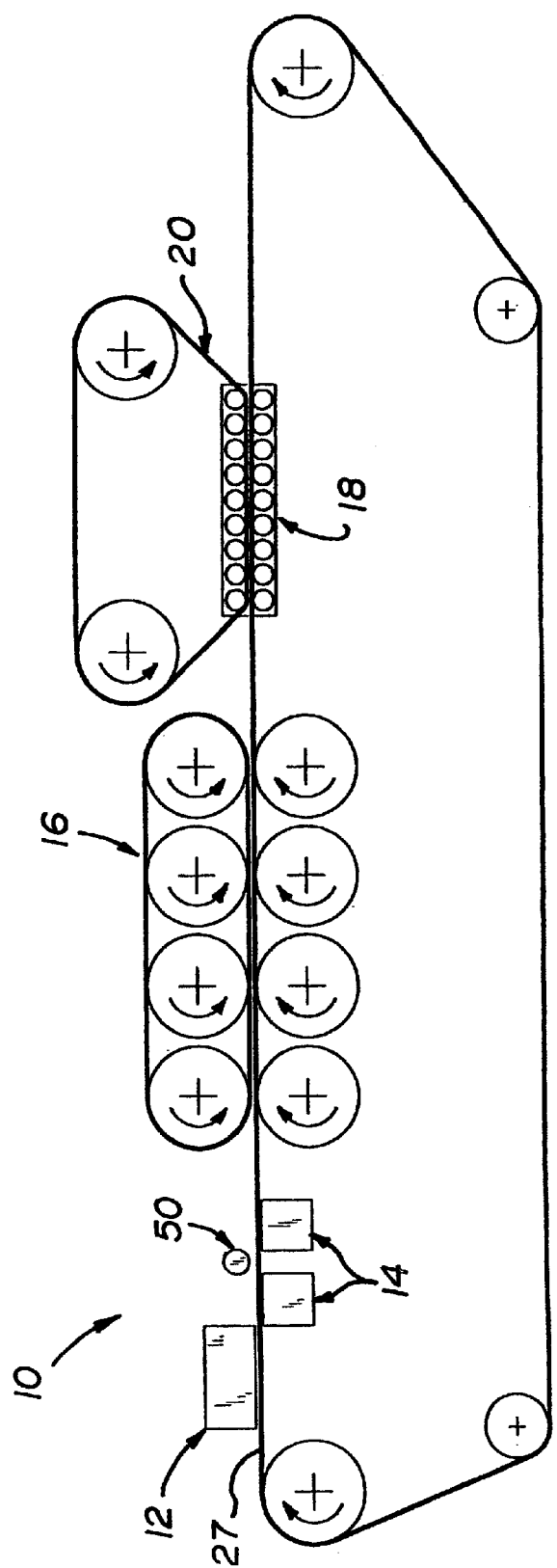
FIG. 1 is a schematic drawing illustrating a production line for forming gypsum fiberboard having a head box, water spray, dewatering vacuums, a dewatering primary press, and a secondary press all for processing a rehydratable gypsum fiber slurry upon a conveyor.

The forming system, generally designated with the numeral 10 and best shown in FIG. 1, includes a head box 12, vacuum boxes 14, a water spray apparatus 50, and a wet (primary) press 16 for 1) nipping the filter cake mat to a desired thickness and 2) removing 80–90% of remaining water. The system 10 also includes a secondary press 18 for compressing the board during setting to a calibrated final thickness and aiding in achieving flexural strength in the final product. The secondary press 18 has a continuous belt 20 that also aids in achieving smoothness to the board surface as the rehydrating mat expands against the belt 20.

Figure 2:
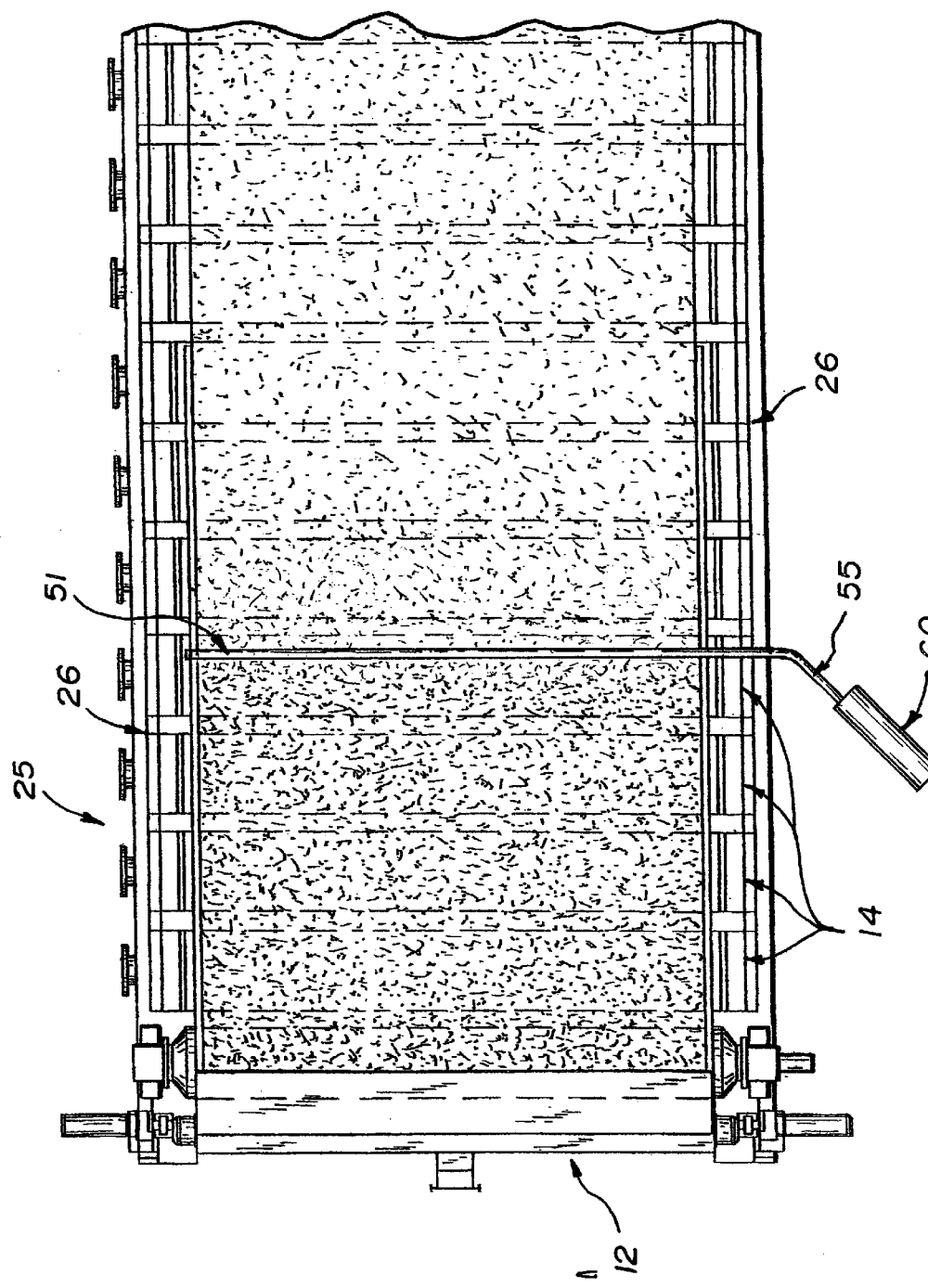
FIG. 2 is an overhead view of the beginning of the forming line, including the head box, forming table containing the slurry pond, and water spray.

With reference to FIG. 2, the head box 12 is used to uniformly disperse the calcined slurry having at least about 70% liquid by weight, across the width of the forming table, where vacuum boxes 14 are used to dewater the slurry into a mat of generally 28–41% moisture content (wet basis) (40–70% moisture content on a dry basis). The forming table 25 includes side dams 26 to contain the slurry pond and a conveyor or forming wire 27 to move the slurry away from the head box 12 and towards the primary press 16. As the slurry moves along the forming table 25, the vacuum boxes 14 dewater the slurry into a mat, creating a decreasing water content gradient in the slurry going from the head box 12 towards the primary press 16. At some point along this gradient, there is a zone referred to as the wet line, where it is observable that the slurry is changing into the wet mat. Put another way, one can see that the slurry is no longer fluid as the water is removed.

As a result of calcination in a previous step, acicular crystals of calcium sulfate hemihydrate form in the slurry. If they commingle with the cellulosic fibers into clumps or flocs at or near the surface of the pond of slurry, the clumps or flocs of commingled material can impart an undesired roughness to the finished product. These clumps or flocs at or near the surface of the slurry may be broken or dispersed by the application of energy to the surface and slightly below the surface of the slurry as the slurry is dewatered. The water spray apparatus 50 described herein is used to impart the energy.

Figure 3:
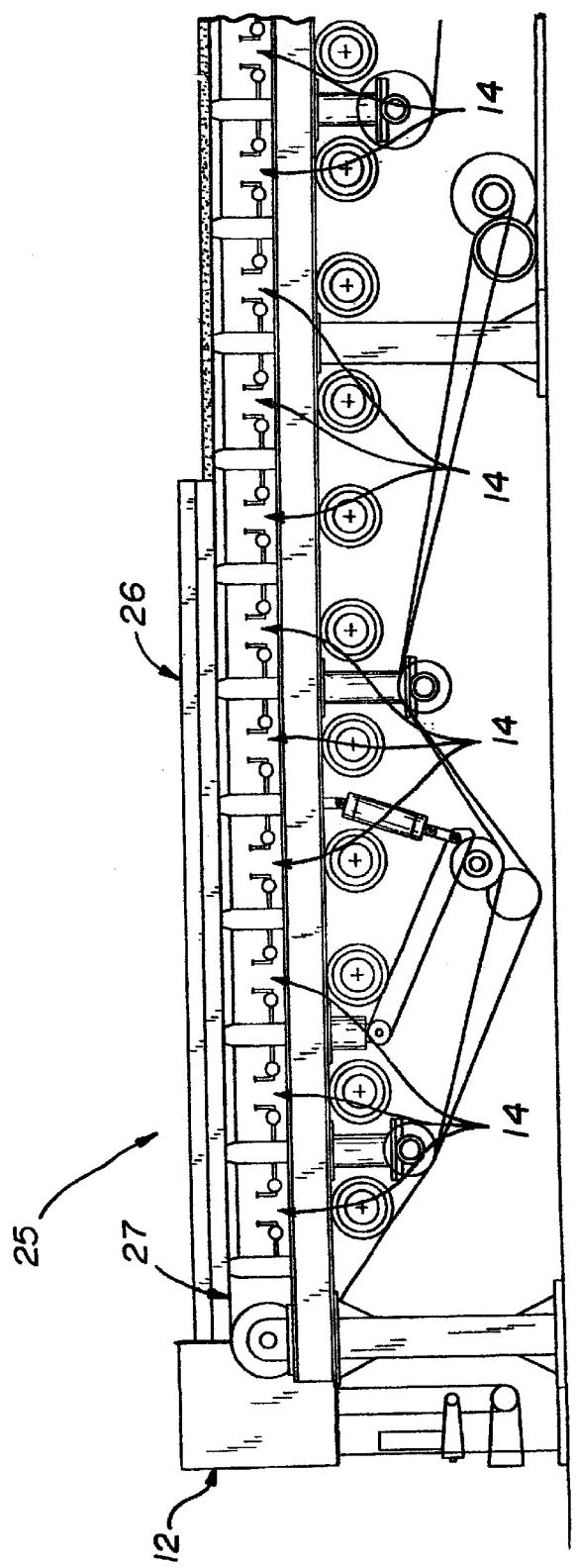
FIG. 3 is a side view of the forming table including the head box, vacuum boxes, side dam, and water spray.
Figure 3A:
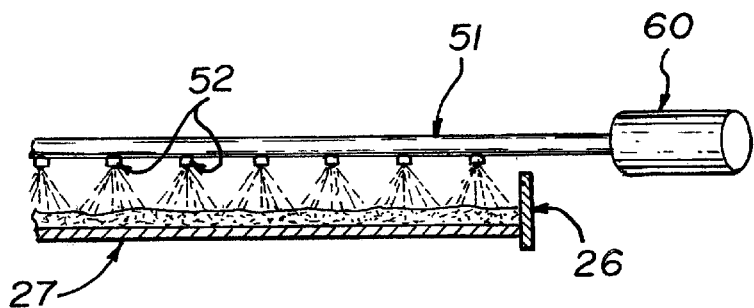
FIG. 3a is a front-view of the water spray apparatus looking upstream including a depiction of the spray to the slurry.
Figure 3B:
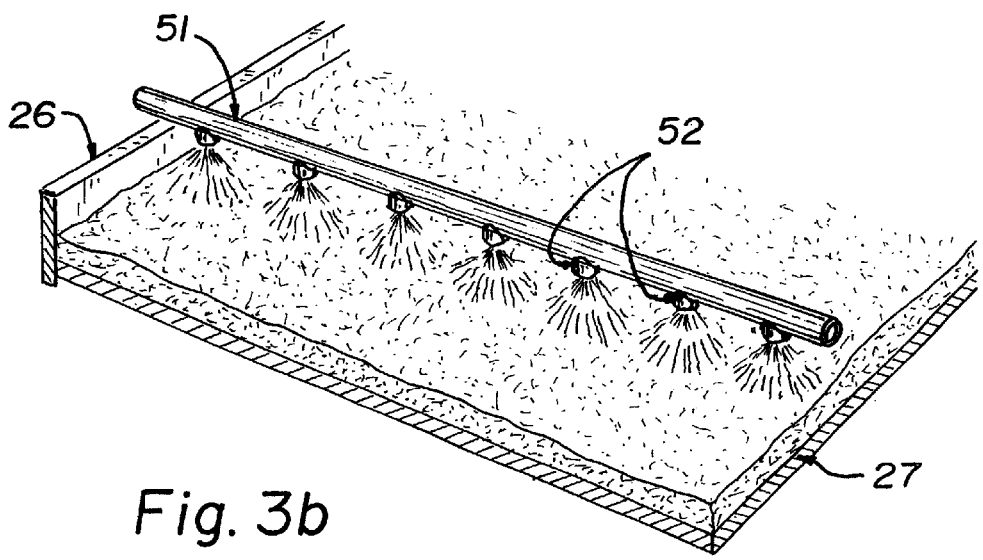
FIG. 3b is a perspective view of the water spray apparatus and pond of slurry.

With reference to FIGS. 2 and 3, the spraying apparatus 50 includes a source of water 60, such as a municipal water supply, gravity tank, or a hydraulic pump, a conduit 55 or a system of conduits or other means to direct the water from the water source, and the nozzles 52 used to direct the spray upon the slurry. The pressure of the water at the nozzles must be sufficient to produce a flow of sufficient strength to impart energy to the surface and slightly below the surface of the slurry pond. It has been found that pressures in the range of 10 to 50 psi yield the good results with a lower pressure yielding the best results. Water flow rates in the range of about 0.0173 gal./ft$^2$ to 0.0330 gal./ft$^2$ at 10 psi and 40 psi, respectively, also yield the best results using 0.040 inch orifice flat fan nozzles. It is preferred that the water spray inpart energy to a depth of up to about one-tenth of the slurry pond thickness. In the preferred embodiment, the nozzles 52 produce a flat fan spray pattern, though other patterns may be used. For instance, the source of water 60 is connected by a conduit 55 to the inlet of a distribution manifold 51. The distribution manifold 51 has a plurality of outlets for water to which the plurality of nozzles 52 are attached The manifold 51 and nozzles 52 are positioned above the forming table 25 at approximately the wet line in an orientation such that the long axis of the manifold 51 is generally across the wet line. The manifold 51 is generally a straight tubular member. Due to the nature of the slurry pond as it experiences vacuum extraction of water on the moving conveyor 27, the wet line is irregular and not a straight line, as would be clear to those skilled in the art. As such, it may be of benefit to construct a manifold 51 that can conform to the shape of the wet line by allowing it to articulate or bend. For instance, the manifold could be constructed of a flexible PVC tube, or other flexible material. The wet line is disrupted from the conformation it would have without the application of the water spray. Accordingly, the process is first started with the spray off and the wet line location is observed for the particular slurry composition being fed from the head box 12. As shown in FIGS. 3, 3a, and 3b, the water spray apparatus, 50 is positionally adjusted along the conveyor 27 to dispose the nozzles 52 generally above the leading point of the wet line. Then, the spraying process begins. In the preferred embodiment the spray is directed perpendicular to the surface of the slurry by the nozzles 52. The wet line is typically irregularly curved and resides in a zone having a length—taken in the direction of conveyor travel—defined as the distance between the furthest upstream point and the furthest downstream point along the wet line. It is preferred that the spray cover the zone length and to either end of the zone length up to about 10% greater than the zone length. With this arrangement, the spray from the nozzles 52 is directed at the surface of the slurry in an area where the slurry is still just fluid but additional coverage is provided to ensure the irregular wet line is treated.

The spray then disrupts the surface of the slurry pond to a fraction of its depth and in doing so, disperses up the undesirable clumps or flocs in that fraction of the depth so they are less than about ¼ inch (6 mm) in their greatest dimensions and desirably no greater than about 2–3 mm, with no clumps or flocs present at all being optimal. By varying the rate of flow, pressure and size of the water droplets in the spray as well as the angle at which the spray hits the slurry pond, differing degrees of smoothness are obtained. It has been found that the best results are obtained when the spray is directed perpendicular to the surface. Minimizing surface roughness is most successfully obtained when the spray imparts energy to, or disrupts the slurry, up to about one-tenth of the depth of the slurry. Energy may be imparted to a depth greater than one-tenth, but doing so does not further improve the surface smoothness of the finished product and may adversely affect formation and subsequent strength. Energy may also be applied to a depth less than one tenth of the depth of the slurry, but less than optimal results are obtained.

After the water spray is applied, the manufacturing process may continue as generally described in the '677 patent. In the preferred embodiment, the slurry pond is further dewatered and formed into a filter cake after it passes the water spray apparatus 50 by the application of additional vacuum boxes 14. With reference to FIG. 1, the conveyor or forming wire 27 carries the filter cake to the primary press 16 which further dewaters the filter cake and nips the material to a desired thickness. The board exits the primary press 16 and is carried on the conveyor 27 to the secondary press 18. The secondary press shapes the board to a final calibrated thickness. During this time, the board begins setting and expands to fill the nip gap. The board expands against the smooth belt 20 of the secondary press 18 which further aids in rendering a smooth surface and also increases flexural strength.

Various features of the invention have been particularly shown and described in connection with the illustrated embodiments of the invention. However, it must be understood that these particular arrangements, and their method of manufacture, do not limit but merely illustrate, and that the invention is to be given its fullest interpretation within the terms of the appended claims.

What is claimed is:

1. A method for making a smooth surfaced gypsum fiberboard panel comprising the steps of:
   mixing ground gypsum and host particles of a fibrous reinforcement material and sufficient liquid to make a dilute slurry consisting of at least about 70% liquid by weight,
   calcining said gypsum, in the presence of said host particles, by heating said dilute slurry under pressure, to form acicular calcium sulfate hemihydrate crystals;
   depositing said dilute slurry on a surface to form a pond of slurry;
   directing a water spray at said pond of slurry to impart energy to the slurry pond surface;
   dewatering said pond of slurry to form a filter cake;
   pressing said filter cake to form a board and to remove additional water therefrom; and
   drying said board to remove any remaining free water.

2. The method in accordance with claim 1 wherein said step of directing a water spray is completed by directing the water spray approximately perpendicular to the surface of the pond of slurry.

3. The method in accordance with claim 1 including the step of creating a wet line on the pond of slurry and directing the waterspray at the surface of the pond of slurry in the vicinity of the wet line.

4. The method in accordance with claim 3 wherein the water spray imparts energy to the pond of slurry from the surface to a depth up to about one-tenth of the depth of the pond of slurry.

5. The method in accordance with claim 3 wherein flocs of commingled acicular crystals and cellulosic fibers at the surface of the slurry pond are broken up to be no more than about 6 mm (¼") in their greatest dimension.

6. The method in accordance with claim 4 wherein flocs of commingled acicular crystals and cellulosic fibers in the portion of the slurry pond from the surface to one-tenth of the depth of the slurry pond are less than about 6 mm (¼") in their greatest dimension.

7. A method for making a smooth surfaced gypsum fiberboard panel comprising the steps of:
   mixing ground gypsum and host particles of a fibrous reinforcement material and sufficient liquid to make a dilute slurry consisting of at least about 70% liquid by weight;
   calcining said gypsum, in the presence of said host particles, by heating under pressure and forming calcium sulfate hemihydrate;
   depositing said calcium sulfate hemihydrate and host particles on a surface to form a pond of slurry;
   creating a wet line atop said slurry;
   directing a water spray against the pond of slurry;
   removing a major portion of liquid from said pond of slurry to form a filter cake;
   rehydrating said gypsum;
   pressing said filter cake to form a board; and
   drying said board.

8. A product made in accordance with the method of claim 1.

9. A product made in accordance with the method of claim 7.

10. A method of imparting a smooth surface to a fiberboard panel comprising the steps of
    providing a slurry of material;
    depositing the material on a surface to form a slurry pond;
    directing a water spray upon the surface of the slurry pond;
    removing a majority of the water present in the slurry pond to form a filter cake; and
    pressing said filter cake into a panel.

11. The method of claim 10 wherein the water spray is directed approximately perpendicular to the surface of the slurry pond.

12. The method of claim 10 wherein the water spray directed upon the surface of the slurry pond imparts energy to a fraction of the depth of the slurry pond.

13. The method of claim 12 wherein the water spray directed upon the surface of the slurry pond imparts energy to a depth of up to about one-tenth of the depth of the slurry pond.

14. The method of claim 12 wherein the energy imparted to the fractional depth of the slurry pond breaks flocs or clumps present in said depth to less than about 6 mm (¼") in their greatest dimension.

15. The method of claim 10 further including the step of determining the location of an fluid wet line of the slurry material deposited on said surface.

16. The method of claim 15 wherein the directing step comprises directing said water spray generally across said fluid wet line.

17. The method of claim 16 further including adjusting a water spray apparatus prior to directing said water spray, and positioning such water spray apparatus whereby said water spray is generally across said fluid wet line.

* * * * *

UNITED STATES PATENT AND TRADEMARK OFFICE
CERTIFICATE OF CORRECTION

PATENT NO. : 6,699,364 B2
DATED : March 2, 2004
INVENTOR(S) : Song et al.

It is certified that error appears in the above-identified patent and that said Letters Patent is hereby corrected as shown below:

Title page,
Item [73], Assignee, should be -- United States Gypsum Company --, not "United States Gypsum Corporation".

Signed and Sealed this

Twentieth Day of July, 2004

JON W. DUDAS
*Acting Director of the United States Patent and Trademark Office*